United States Patent [19]
Volz et al.

[11] Patent Number: 5,370,450
[45] Date of Patent: Dec. 6, 1994

[54] BRAKE PRESSURE CONTROL APPARATUS

[75] Inventors: Peter Volz, Darmstadt; Bernd Schopper, Kriftel, both of Germany

[73] Assignee: Alfred Teves GmbH, Frankfurt am Main, Germany

[21] Appl. No.: 230,758

[22] Filed: Apr. 21, 1994

Related U.S. Application Data

[62] Division of Ser. No. 952,883, Nov. 25, 1992, Pat. No. 5,333,945.

[30] Foreign Application Priority Data

May 25, 1990 [DE] Germany ............................. 4016749
May 25, 1992 [DE] Germany ............................. 4016754

[51] Int. Cl.[5] ............................................. B60T 8/36
[52] U.S. Cl. ........................ 303/119.2; 303/84.1; 303/900
[58] Field of Search ............ 303/84.1, 84.2, 119.1, 303/119.2, 900, 113.1, 116.1, 113.2, 9.75, 9.62; 137/596.17, 627.5; 251/129.18, 129.19

[56] References Cited

U.S. PATENT DOCUMENTS

| | | | |
|---|---|---|---|
| 4,526,203 | 7/1985 | Leiber | 303/119.2 X |
| 4,890,890 | 1/1990 | Leiber | 303/119.2 X |
| 5,277,481 | 1/1994 | Weiss et al. | 303/119.1 X |

Primary Examiner—Robert J. Oberleitner
Assistant Examiner—Lee W. Young
Attorney, Agent, or Firm—Robert P. Seitter; J. Gordon Lewis

[57] ABSTRACT

A brake pressure control apparatus for automotive vehicles with an anti-locking control system is presented. It is comprised of a master cylinder, of one or of a plurality of wheel cylinders for wheel brakes, of a pressure modulator for the modulation of the hydraulic pressure in the wheel cylinders of the wheel brakes during a brake pressure control modus, of at least one motor-driven pump for the generation of a hydraulic pressure, of an electronic controller. The outlet valve associated with a wheel cylinder is furnished with a closing element (5) which is connected to the closing element (6) of the inlet valve through a captivating apparatus which is configured and positioned in such a manner that in its closing position the said closing element (5) of said outlet valve opens the said closing element (6) of said inlet valve and in its open position it closes said closing element of the inlet valve. The inlet valve and the outlet valve have an electronic coupling comprised of an inlet solenoid valve and of an orifice. In the control modus, said inlet solenoid valve will be switched and be brought into its closed position. Under the effect of the master cylinder pressure and/or the pump pressure, said valve is, now, given the function of a non-return valve, which remains in its closed position even while the actuating solenoid is in the de-energized condition. In this situation, pressure agent is restrictedly conveyed through the orifice to the wheel cylinder.

1 Claim, 7 Drawing Sheets

BRAKE PRESSURE CONTROL APPARATUS

This application is a divisional of Ser. No. 07/952,883, filed Nov. 25, 1992, now U.S. Pat. No. 5,333,945.

BACKGROUND OF THE INVENTION

The invention is related to a brake pressure control system, in particular for automotive vehicles, with an anti-locking control (ABS) and/or with a traction slip control (TSS), which operates with hydraulic fluid pressure, such systems include a master cylinder, one or more wheel cylinders for wheel brakes, and a pressure modulator for the modulation of the hydraulic pressure within said wheel cylinders of the wheel brakes in the course of a brake pressure control mode These systems also include a motor-driven pump for the generation of hydraulic pressure, and an electronic controller, and an inlet and an outlet valve associated with each wheel cylinder.

An example of such a brake system is described, for example, in the German patent application published without examination, No. 3,731,603. The application of the invention is, however, not limited to this type.

The electronic controller controls operation of the inlet and outlet valves in accordance with the control algorithm incorporated in the controller . A pressure reduction phase is generated in the wheel cylinder when the outlet valve is open and the inlet valve is closed. When the inlet valve is closed and the outlet valve is closed, a pressure stabilization phase is established, and, when the inlet valve is open and the outlet valve is closed a pressure rebuilding-up phase ensues.

Furthermore, hydraulic connections have been described in which the inlet valve has a restriction effect. Please refer to the German patent application No. P 3,919,842.1 in this respect.

In that patent application, a hydraulic brake system for a vehicle is described which is equipped with an anti-locking control system and is comprised of a master cylinder, a fluid pressure accumulator, at least one wheel brake which is in connection with the master brake cylinder through a brake line and is in connection with the fluid pressure accumulator through a return line. An electromagnetically actuated outlet valve is inserted in the return line and shuts off the return line in its normal position and opens the return line in its switching position. A restriction valve is incorporated in the brake line, furnished with two switching positions, an unrestricted connection existing between the wheel brake and the master brake cylinder in the first switching position and a restricted connection existing between the wheel brake and the master brake cylinder in the second switching position. A pump aspirates fluid under pressure from the fluid pressure accumulator and delivers it through a pressure line into the master cylinder. A sensor monitors the angular velocity of the wheel to be braked, and an electronic evaluation unit evaluates the sensor signal and generates switching signals for the pump drive and for the outlet valve.

It is proposed in the forementioned German patent application that the restriction valve is connected by means of a control line to the outlet of the pump so that the pressure at the outlet of the pump puts the restriction valve from the first into the second switching position.

See the above-mentioned German patent application No. P 3,919,842.1 for an illustration of this type of system.

See also U.S. Pat. No. 4,090,739 which describes another such system.

A brake system with anti-locking control is described there which is suited for use in motorcycles or in small automotive vehicles. The system is comprised of an electromagnetically actuatable anti-locking control valve which may assume different positions: a normal position, a pressure decreasing position and a locking position between two pistons. The valve is subject to the action of a spring, urged to the normal position. In that position, the valve communicates brake pressure to the wheel cylinder. In the anti-locking control mode, the valve is slid into the pressure decreasing position. The valve is hindered from returning from the pressure decreasing position into the normal position as long as fluid pressure is exerted by the master cylinder. The valve remains in the locking position when the supply of fluid pressure is locked. A bypass is provided which bridges the control valve. A restricted cross-sectional area of flow is envisaged in the bypass. The objective achieved is that in a second and subsequent pressure build-up phases only a limited volume of brake fluid is made available.

Further details may be seen in the above-mentioned U.S. patent.

The present invention has the following objects:

Basically, the cost of manufacture is to be reduced. This is to be achieved in particular by the saving of magnet coils, of electrical lines and of plug pins.

The assembly space required for the incorporation of the anti-locking control is to be reduced.

The applicability of the inventive anti-locking control is to be more universal than customary according to the state of the art. For example, an application for so-called "open" and "closed" brake systems with anti-locking control is to be possible. Open brake systems are those systems in which a fluid reservoir is vented to the atmosphere and closed systems are systems which do not have an unpressurized reservoir.

The present invention allows the brake passive control to be integrated in the valve block of the control unit.

By the present invention attaining the effect of a flow limiting valve is enabled. This means that after reaching a nominal flow rate, this flow rate is maintained substantially constant notwithstanding fluctuations of the pressure level or pressure differentials up stream and downstream of the valve.

"Nominal flow rate" means in this case that not more than a defined volume of fluid per unit of time is conveyed to the wheel cylinder in the anti-locking control mode, regardless of the level of the pressure on the delivery side of the pump or the pressure side of the master cylinder.

It is, moreover, part of the object of the invention that besides avoiding undesirably high wheel cylinder pressures in the control mode, a rapid pressure reduction takes place in the control mode when a pressure reduction is prescribed by the control algorithm. The control quality is to be improved generally.

The invention has, furthermore, the object to eliminate the electromagnetically actuated inlet valves, open when deenergized, which are typically required in the prior art.

Furthermore, the invention should allow this control independent of any changes of the viscosity and temperature of the fluid. Constant pressure gradients during control should be enabled by the invention.

It is, moreover, one of the objects of the invention to reduce or to prevent any noises during the control mode.

Besides the reduction of the expenditure for electrical lines, also the fittings are reduced in size. In addition, it is to be rendered possible by the invention to reduce the expenditure for the driver stage of the electronic controller. A more simple arrangement of the ducts in the valve assembly for the control as compared to that of the state of the art is to be rendered possible by the invention.

SUMMARY OF THE INVENTION

According to the invention, the objects set out are achieved in one embodiment by an arrangement in which the closing element of the outlet valve and the closing element of the inlet valve are coupled so that in its closing position, the closing element of the outlet valve exerts a spring force on the closing element of the inlet valve, resisting opening by permitting its opening; and, in its open position, the opening movement of the closing element of the outlet valve allows closing movement of the closing element of the inlet.

The outlet valve is a valve, closed when deenergized (NC valve), which is actuatable electromagnetically as such in the prior-art manner and which in the deenergized condition of the actuating solenoid assumes its normal, closed position.

It has proved to be particularly advantageous that the valve closing elements are furnished with rods and that the coupling is constituted by a coupling housing, which is coupled to the rod of the closing elements of the outlet valve and within which a compression coupling spring is accommodated which exerts an expanding force on the rods of the closing elements and, thus, on the closing elements themselves.

In another embodiment, the desired control effects are achieved by a brake pressure control system having a master cylinder-pump chamber connected to the master cylinder and the pump, a wheel cylinder chamber connected to the wheel cylinder, and a pump suction-side chamber connect ed to the suction side of the pump. An opening is provided between the master cylinder pump chamber and the wheel cylinder chamber which is closable by the inlet valve. An opening is also provided between the wheel cylinder chamber and the pump suction-side chamber which is closable by the outlet valve. Between the master cylinder pump chamber and the wheel cylinder chamber, a restrict ion is provided allowing a restricted flow of fluid.

In a variation of this embodiment, two wheel chambers are provided which are connected to each other, a first wheel cylinder chamber and the master cylinder pump chamber isolatable by the inlet valve, and the second wheel cylinder chamber and the pump suction-side chamber isolatable by the outlet valve.

A further development of this concept consists in that the first wheel cylinder chamber and the pump suction-side chamber are separated by a seal, and in that the rod of the closing element of the outlet valve is sealingly guided within the seal between the first wheel cylinder chamber and the pump suction-side chamber.

It is proposed with regard to the implementation of the active connection between the inlet valve and the outlet valve that the connecting assembly between the rods of the inlet valve and of the outlet valve is constituted by a coupling housing, preferably in the form of a bushing, which is coupled to the rod of the outlet valve and which is furnished with a stop for a front face-side collar of the rod of the inlet valve. Within the coupling housing, a compression coupling spring is positioned which acts on the bottom of the housing and on the front face-side collar of the rod of the inlet valve which elastically keeps the closing element of the inlet valve and the closing element of the outlet valve at a determined distance variable with the distance of the stroke of the collar within the housing.

It may be provided in addition that the closing element of the inlet valve is arranged so as to be prestressed in the direction of its valve seat by a spring.

As further development of the invention a flow limiting valve element is provided, comprised of a control element which is movably positioned within the wheel cylinder chamber and which is furnished with the inlet valve and an orifice which connect the master cylinder pump chamber to the master cylinder chamber. The control element is moved by the pressure differential between the master cylinder pump chamber and the wheel cylinder chamber in such a way that a control edge positioned at the control element passes over the cross-sectional area of the outlet port to the wheel cylinder to such an extent that a self regulating effect is achieved in the range of the cross-sectional area of the port and of the control edge.

In addition, a control element comprising the inlet in the form of a bushing is provided, which divides a valve chamber into a master cylinder pump chamber and a wheel cylinder chamber. The inlet valve is movable by the pressure differential between the master cylinder pump chamber and the cylinder chamber, which inlet valve is furnished with an orifice having a restricted flow cross-sectional area which connects the master cylinder pump chamber to the wheel cylinder chamber. In the presence of a more elevated pressure in the master cylinder pump chamber, the control element is disposed so as to be movable, against the force of a control spring, in the direction of the cross-sectional area of the outlet port. The control element is furnished with a control edge which is capable of passing at least partly over the cross-sectional area of the outlet port. The flow cross-sectional area of the orifice, the position of the control edge with respect to the cross-sectional area of the port, the spring characteristic of the control spring, the size and shape of the cross-sectional area of the port are configured such that by a self regulating process which is caused by movement of the control edge over the port, a flow limiting effect is attained for the wheel cylinder which leads to a determined pressure rebuilding-up gradient within the wheel cylinder in the anti-locking control mode.

In a further preferred embodiment, it is envisaged that the control element in the form of a bushing divides a valve chamber into a master cylinder pump chamber and a wheel cylinder chamber, which control element is movable by the pressure differential between the master cylinder pump chamber and the wheel cylinder chamber. An orifice is provided having a flow cross-sectional area which connects the master cylinder pump chamber to the wheel cylinder chamber In the presence of a more elevated pressure within the master cylinder pump chamber, the control element is disposed so as to be movable against the force of the control spring in the direction of the cross-sectional area of the outlet port to the wheel cylinder. In the normal braking mode, the control element is slid by the more elevated pressure within the master cylinder pump chamber against the force of the control spring and express fluid into the wheel cylinder.

In a particularly inexpensive design version, the movable control element is configured in the shape of a bushing with an external annular groove, and in that an edge which comes about due to the annular groove carries out the self regulating process as a control edge, jointly with the cross-sectional area of the port to the supply side of the pump and/or of the master cylinder.

By the invention, the cost of manufacture is reduced substantially. The expenditure for the electrical components and lines, in particular the expenditure for magnet coils, plug pins and for the driver stage within the electronic controller, are considerably reduced. The assembly space for the control components is smaller as compared to the state of the art. The brake pressure control apparatus may be integrated in the existing valve block of the control unit.

In alternate design variations the set-up and manufacture of the brake pressure control systems are cheaper. In particular, the expenditure for the cable harness is substantially reduced. The plug contacts at the electronic controller and at the pressure modulator are fewer. Also the electronic controller itself is cheaper in its set-up and its manufacture by saving valve driver components. The invention allows the use of nonpulsed inlet valves. Non pulsed inlet valves are sturdier, simpler, and may be manufactured at lower cost than pulsed inlet valves.

Valve blocks equipped with the inventive brake pressure control apparatus can be manufactured and assembled on existing facilities.

According to yet another embodiment of the invention, an inlet valve for the wheel cylinder is provided comprised of an inlet solenoid valve and an orifice In the normal braking mode the inlet solenoid valve is deenergized and open, and in the control mode the inlet solenoid valve is switched by energization in a first control phase, to a closed position. In a second control phase the inlet solenoid valve acts as a non-return valve under the action of the master cylinder pressure and/or of the pump pressure and is maintained in the closed position even if and when the actuating solenoid is in the de-energized condition. In the closed condition of the inlet solenoid valve, fluid is conveyed restrictedly through the orifice to the wheel cylinder. In addition to the inlet solenoid valve, an electromagnetically controllable outlet valve is provided for the wheel cylinder, which is in the closed condition when deenergization, which is being switched into the open position in the control in order to bring about pressure decreases within the wheel cylinder. A common electrical control line is used for both the inlet solenoid valve and the outlet valve.

The need for a prior-art inlet valve which is open when deenergized, and the separate line and driver components necessary for the switching of the inlet valve are thus eliminated.

Further details of the invention, of the objects set and of the advantages attained are revealed by the undermentioned description of embodiments of the invention.

DESCRIPTION OF THE DRAWINGS

Each of the FIGS. 1, 2, 4, 5, and 7 are partially sectional and fragmentary views of a combined inlet and outlet valve and schematic depiction of other components of respective different embodiments of the system according to the invention.

DETAILED DESCRIPTION

The descriptions and the Figures of the above cited references may be referred to for an explanation of the background of the invention which will be described in the following.

Figure 1:
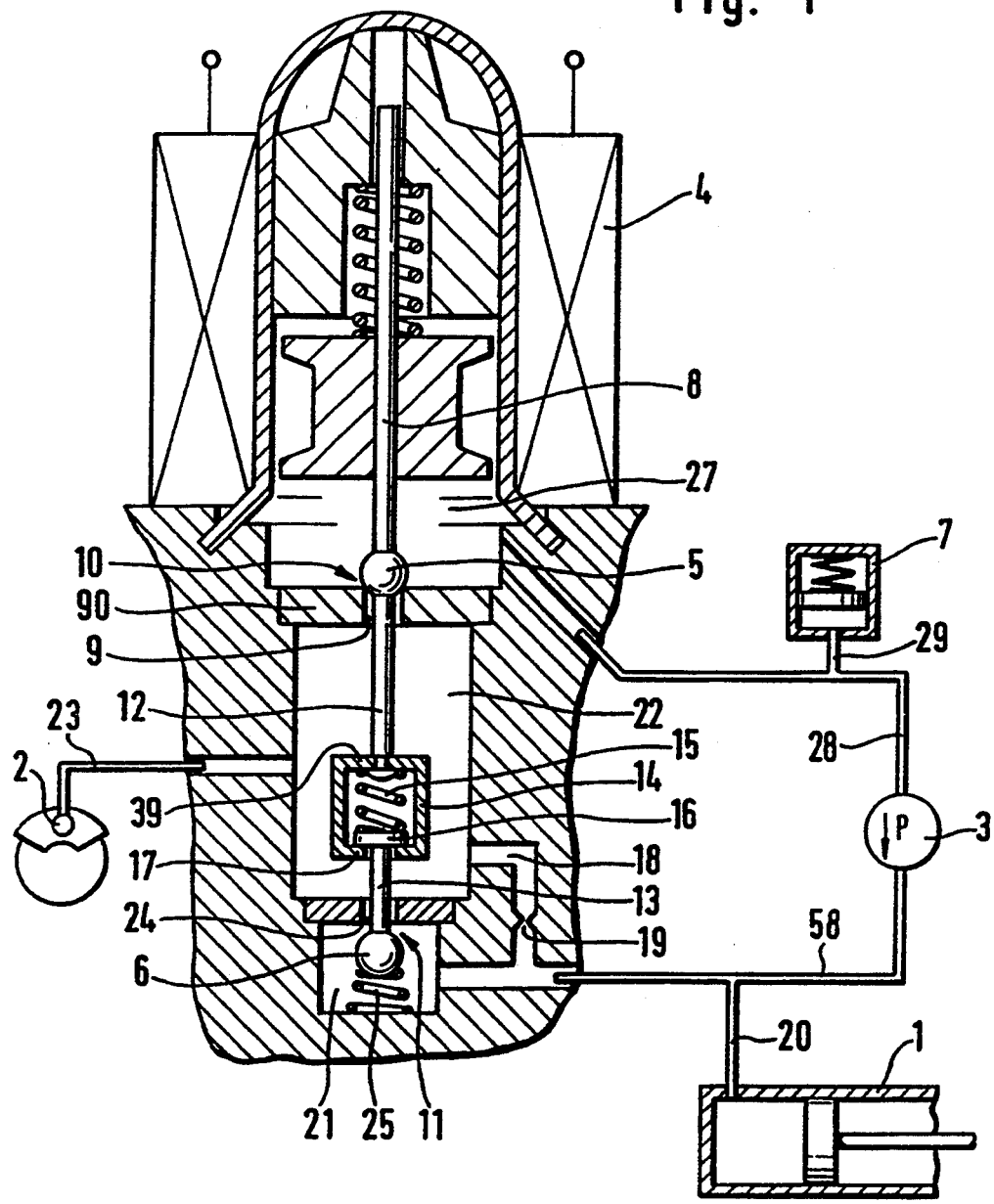
Figure 2:
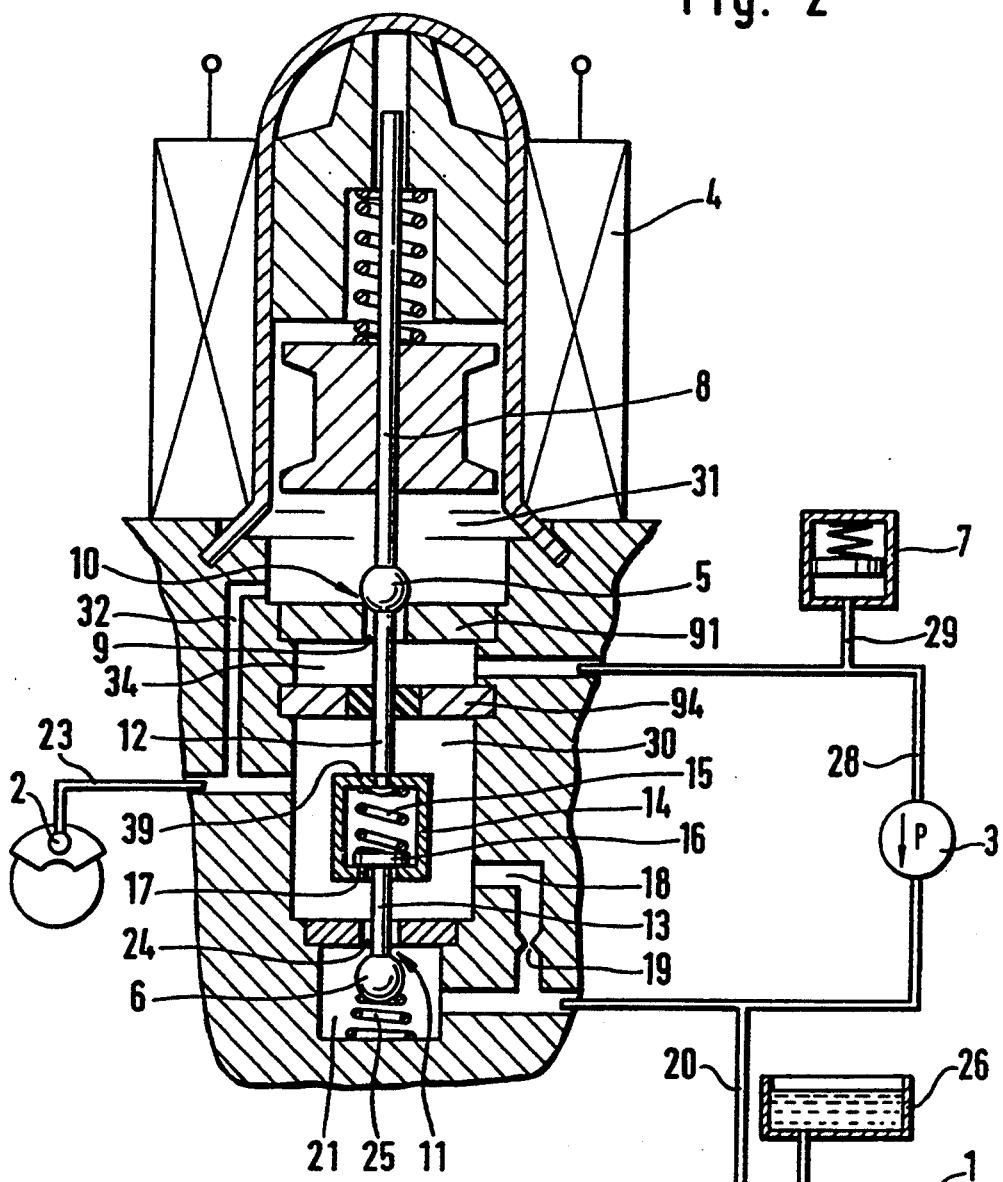

In FIGS. 1 and 2 two embodiments of a combination inlet and outlet valve in a single valve housing H are illustrated. The outlet valve 10 is closed when deenergized, the inlet valve 11 actuated by the outlet valve. The detailed description of the embodiments according to FIGS. 1 and 2 can serve to complete the understanding of the embodiments according to FIGS. 4 and 7.

In FIGS. 1 and 2, the brake pressure control system includes a master cylinder 1, a wheel cylinder 2, and a motor driven pump 3. The outlet valve 10 is comprised of the upper part of the partially sectional structure, and includes magnet coil 4. The closing element 5 of the outlet valve is ball-shaped and the inlet valve 11 is comprised of the lower part of the structure and includes a ball shaped closing element 6. The system includes a low-pressure accumulator 7.

In FIGS. 1 and 2 the closing element 5 of the outlet valve 10 is actuated by a tie rod 8. When the magnet coil 4 is energized, the tie rod 8 pulls the closing element 5 upward and will open the valve seat 9 of the outlet valve 10.

The valve seat 9 of the outlet valve is located in an intermediate plate 90.

A coupling between the closing element 5 of the outlet valve 10 and the closing element 6 of the inlet valve 11 is established by rods 12, 13, and an associated coupling housing 14. Rod 12 is fixed to the coupling housing 14 while rod 13 has a lost motion connection with head 16 able to move away from housing bottom 17. Within the housing 14, a compression spring 15 is disposed which keeps the front face-side collar 16 of the rod 13 of the closing element 6 of the inlet valve 11 in abutment against the lower stop 17 of the housing 14. In this configuration, the compression spring 15 bears against the top 39 of the coupling housing 14 and head 16. When the closing elements of the outlet valve 10 is against the seat 9, the spring 15 exerts a force being generated resisting movement of the closing element 6 to a closed condition.

Line 18 having an orifice 19 passes by the inlet valve 11.

As is set forth above, the closing element 6 of the inlet valve 11 is indirectly actuated by the closing elements of the outlet valve 10 through the rods 12, 13 and housing 14.

In the normal braking mode, fluid will flow through the line 20 into a chamber 21 in the valve housing H connected to the master cylinder 1 and the outlet of the pump 3 by actuation of the master cylinder 1. In this situation, the inlet valve 11 is held open by the force of spring 15. Fluid will flow thence into an intermediate chamber 22 connected to the wheel cylinder 2. From there, fluid flows through the line 23 into the wheel cylinder 2.

In the anti-locking control mode, the pump 3 will be put into operation by starting of the electric driving motor as commanded by an output command signal of the electronic controller.

In addition, the magnet coil 4 will be energized by a further output signal of the controller. By the action of the tie rod 8, the closing element 5 of the outlet valve will be lifted and, thus, open the seat 9 of the outlet valve 10.

Simultaneously, the seat 24 of the inlet valve 11 will be closed by the closing element 6 due to the described decoupling between the closing element 5 of the outlet valve 10 and the closing element 6 of the inlet valve 11. The closing element 6 of the inlet valve 11 is subject to the force of a compression spring 25 to be urged closed.

The direct fluid connection between the master cylinder 1 and the wheel cylinder 2 is, thus, interrupted. The pump 3 will deliver fluid under pressure through the line 58 into the chamber 21.

Fluid is allowed to flow into the wheel cylinder chamber 22 only restrictedly through the orifice 19. In this situation, more fluid will flow through the valve seat 9 of the outlet valve 10 out of the intermediate chamber 22 into a pump suction-side connected chamber 27 than fluid flowing into the intermediate wheel cylinder chamber 22 through the orifice 19.

The pump suction-side chamber 27 is connected through the line 28 to the suction side of the pump 3. A branch line 29 connects the suction line 28 to the low-pressure accumulator 7.

In the embodiment according to FIG. 2, the pump suction-side chamber 34 is located between an intermediate plate 91 which incorporates the valve seat 9 of the outlet valve 10, on one side, and an intermediate plate 94, on the other side. The intermediate plate 94 is furnished with a seal which guides the rod 12.

In the embodiment according to FIG. 2, two wheel cylinder connected chambers exist, namely a first wheel cylinder chamber 30 and a second wheel cylinder chamber 31. The first wheel cylinder chamber 30 is connectable through the inlet valve 11 to the master cylinder pump chamber 21. The second wheel cylinder chamber 31, linked to the first wheel cylinder chamber 30 through the line 32, is disposed upstream of the outlet valve 10 with respect to the flow direction. In the embodiment according to FIG. 2, the closing element 5 of the outlet valve 10 is, thus, subjected to the wheel cylinder pressure in the normal braking mode. As a consequence, the closing element 5 will be pressed onto the valve seat 9, which leads to a better sealing. The valve seat 9 is located in intermediate plate 91.

In the event of actuation of the master cylinder 1 which is furnished with the fluid reservoir 26, brake fluid will be conveyed into the master cylinder pump chamber 21 through the line 20. From there, the brake fluid reaches the first wheel cylinder chamber 30 and over the line 23 the wheel cylinder 2. At the same time, fluid will flow over the line 32 into the second wheel cylinder chamber 31.

In the anti-locking control mode, the pump 3 starts and the magnet coil 4 is energized. The closing element 5 is lifted and will open up valve seat 9 of the outlet valve 10. The closing element 6 of the inlet valve 11 closes.

Flow from the pump 3 thus enters chamber 21 only through the orifice 19. As a result, only a slight volume of fluid will flow through the orifice 19 into the first wheel cylinder chamber 30. A larger volume of fluid will flow out of the second wheel cylinder chamber 31 through the open outlet valve into the pump suction-side chamber 34, and through the line 28 to the suction side of the pump 3.

A pressure decrease within the wheel cylinder 2 will thus occur.

Figure 3:
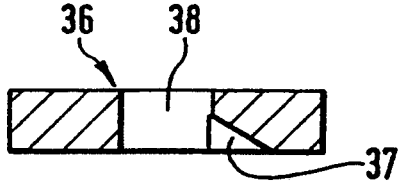
FIG. 3 is an enlarged sectional view of a detail pertaining to the embodiments of the invention according to FIGS. 1 and 2.

In FIG. 3, it can be seen that the valve seat 36 of the inlet valve 11 is alternatively formed with a notch 37. The notch 37 acts as a restrictor opening or orifice when the closing element 6 of the inlet valve 11 comes to rest on the valve seat 36. Reference numeral 38 denotes the main area of opening of the inlet valve seat 36.

In a corresponding manner, a notch restrictor opening may be provided in the closing element 6 of the inlet valve 11 as a further alternative.

A separate line with an orifice, which bypasses the inlet valve 11 may be eliminated by using the restrictor openings in the closing element 6 or in the valve seat 36.

Figure 4:
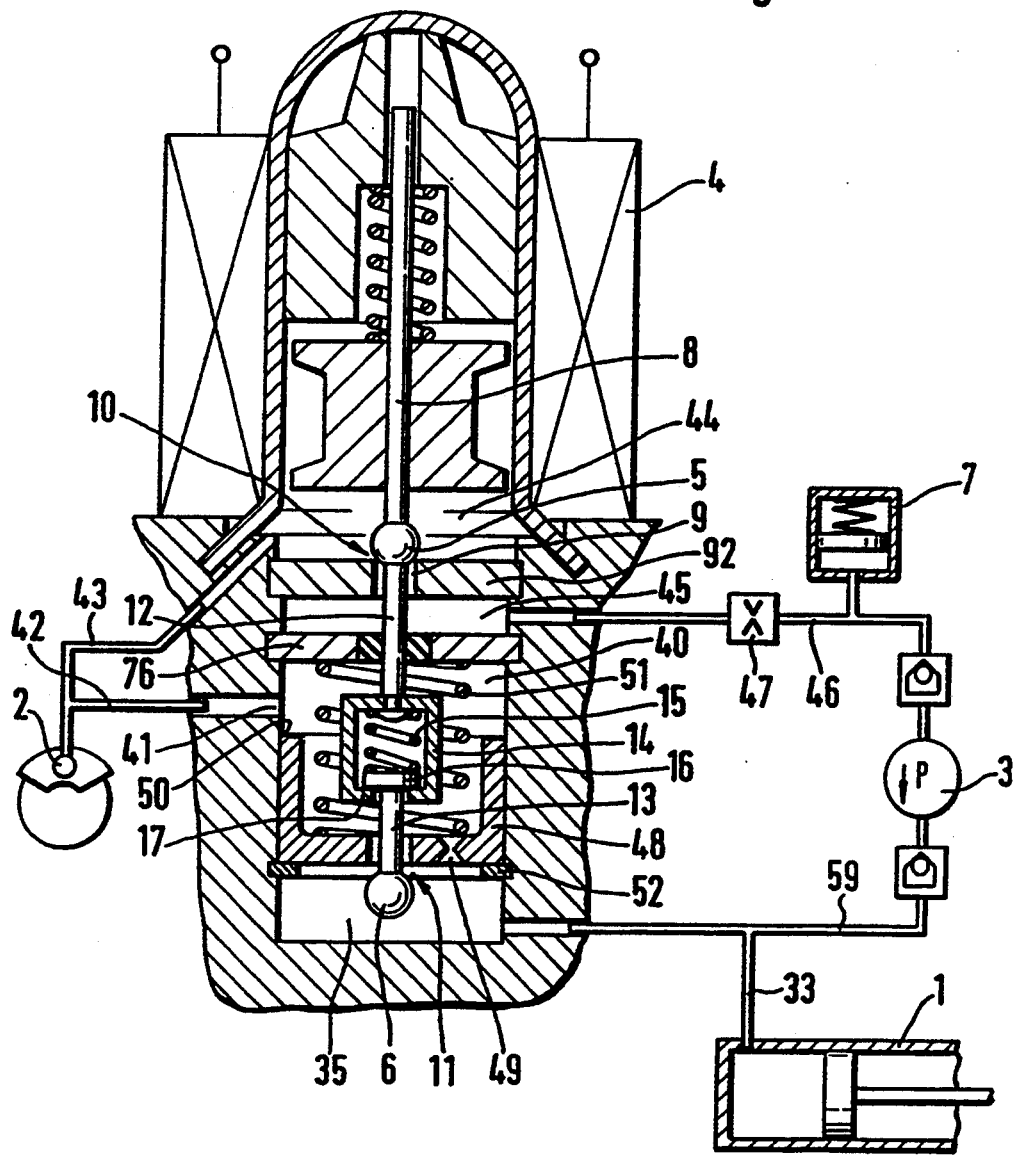

In FIG. 4, fluid will be delivered by the master cylinder 1 over the line 33 into the master cylinder pump chamber 35 in the normal braking mode. The inlet valve 11 being open, fluid will be conveyed into the first wheel cylinder chamber 40 and from there through the port 41 of the line 42 forth to the wheel cylinder 2. Through the line 43, the second wheel cylinder chamber 44 is filled with fluid.

In the anti-locking control mode, the pump 3 will be put into operation and the inlet valve 11 will be closed, closing element 6 coming to rest on the valve seat.

The pump 3 delivers fluid under pressure into the master cylinder pump chamber 35 via line 59. The pump 7 pressure is exerted against the lower front wall of a control bushing 48 and on one side of an orifice 49 in the bushing 48. As a consequence, the control bushing 48 moves in an upward direction as viewed in FIG. 4. The orifice 49 allow s only a slight volumetric flow.

Simultaneously, the outlet valve 10 is opened, and, closing element 5 will be lifted off from the valve seat in the intermediate plate 92. The valve seat 9 is thus opened.

Fluid will now be allowed to flow out of the wheel cylinder 2 through the line 43 the second wheel cylinder chamber 44, and into the pump suction-side chamber 45. The pump suction-side chamber 45 is separated with respect to the first wheel cylinder chamber 40 by an intermediate plate 76 with seal. The pump suction-side chamber 45 is connected through the line 46 to the suction side of the pump 3. The line 46 is equipped with an orifice 47 and is connected to the low-pressure accumulator 7.

The flow cross-sectional area of the orifice 49 located in the bottom of the control bushing 48, the position of the control edge 50 of the control bushing 48, the characteristics of the control spring 51, the size and the shape of the cross-sectional area of the port 41 to the line 42 leading to the wheel cylinder 2 have parameters and are configured such that the control edge 50 passes over part of the cross-sectional area of the port 41. A self-regulating process occurs by movement of the control edge 50 across the cross-sectional area of the port 41. The effect of a flow limiting valve is thereby established. This means that on reaching a nominal flow rate (volume of fluid per unit of time) a substantially constant flow of fluid will be conveyed to the wheel cylinder 2, no matter what the pressure level of the pump pressure and/or of the master cylinder is.

A stop 52 positions the control bushing 48 in its position of rest.

Figure 5:
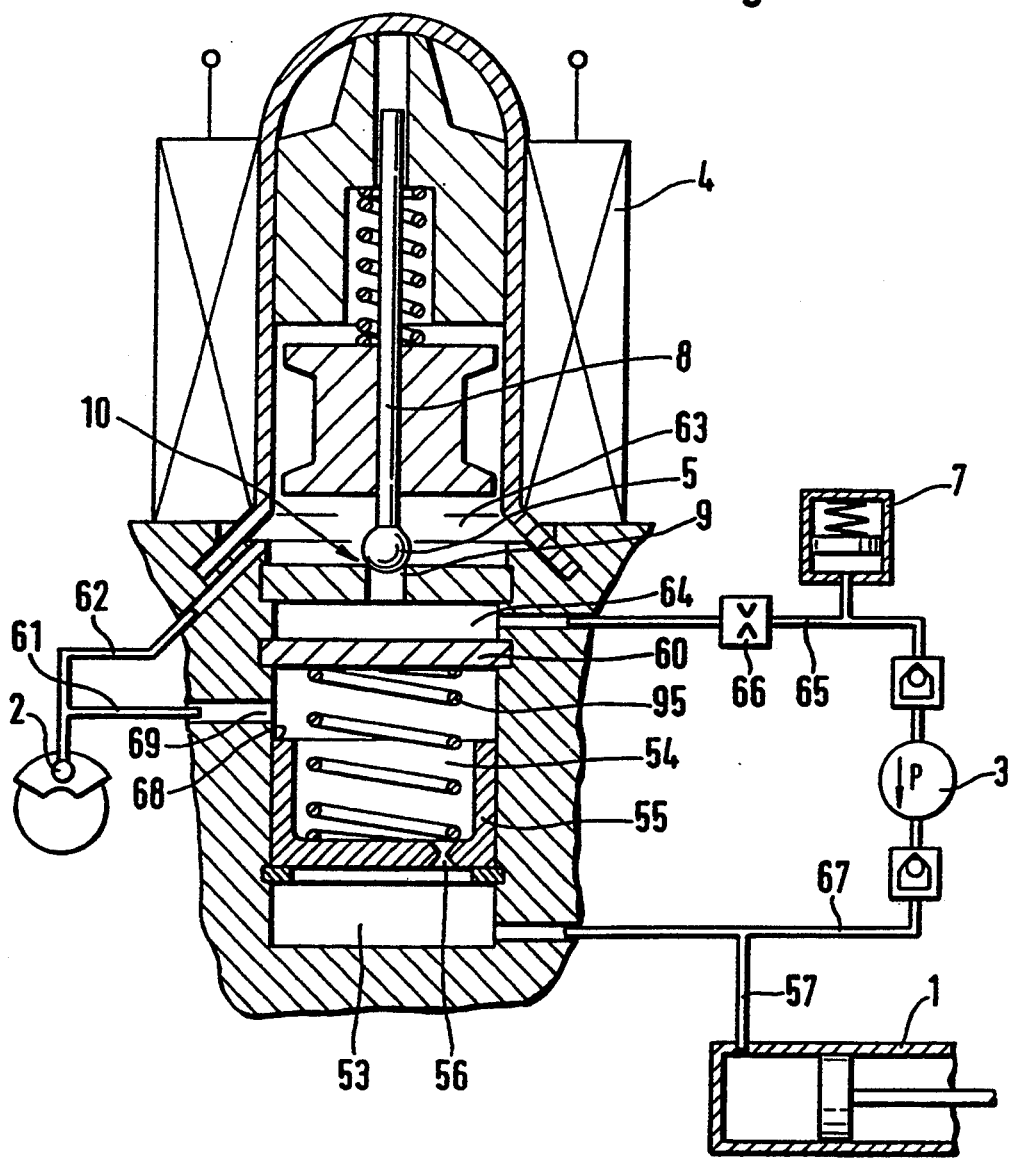

In the embodiment according to FIG. 5 a simplification has been carried out with respect to the previously described embodiments.

In the embodiment according to FIG. 5, the customary inlet valve with closing element and valve seat is eliminated. The master cylinder pump chamber 53 is separated from the first wheel cylinder chamber 54 by a control bushing 55 which is prestressed by a control spring 95. A connection between the master cylinder pump chamber 53 and the wheel cylinder chamber 54 exists solely due to the orifice 56 in the bottom of the control bushing 55.

In the normal braking mode, the master cylinder 1 delivers fluid through the line 57 into the master cylinder pump chamber 53. The control bushing will be slid in upward direction due to the pressure which is built up within the master cylinder pump chamber 53.

In this manner, fluid will be expressed out of the first wheel cylinder chamber 54 which is closed by the plate 60 into the wheel cylinder 2 through the line 61.

In the anti-locking control mode, the operation of the pump 3 is initiated and delivers fluid through the line 67 into the master cylinder pump chamber 53. The outlet valve is also opened at the same time.

Fluid flows through line 62 from the wheel cylinder 2 into the second wheel cylinder chamber 63 and from there through the opened outlet valve 10 into pump suction side chamber 64. Fluid is delivered over the line 65 from the pump suction side chamber 64 to the suction side of the pump 3. Also in this instance, the line 65 is furnished with an orifice 66. The line 65 is connected to the low-pressure accumulator.

In the anti-locking control mode, the control bushing 55 is slid further upward due to the pump pressure in the master cylinder pump chamber 53, so that the control edge 68 of said control bushing 55 jointly with the cross-sectional area of the port to the line 61 going to the wheel cylinder 2 will carry out a self regulating process similarly as has been described in connection with FIG. 4.

Also, in the embodiment according to FIG. 5, the spring characteristic of the control spring, the axial extension of the control spring, the position of the control bushing 55 and the control edge, 68, the size and the shape of the port 69 to the supply line 61 going to the wheel cylinder 2, and the cross-sectional flow area of the orifice 56 in the bottom of the control bushing 55, have to be set with one another in such a way that the desired self regulating effect comes about in the range of the cross-sectional area of the port 69 of the line going to the wheel cylinder 2.

In this embodiment, too, the effect of a flow limiting valve as has been described above will be achieved due to the self regulating effect.

Figure 6:
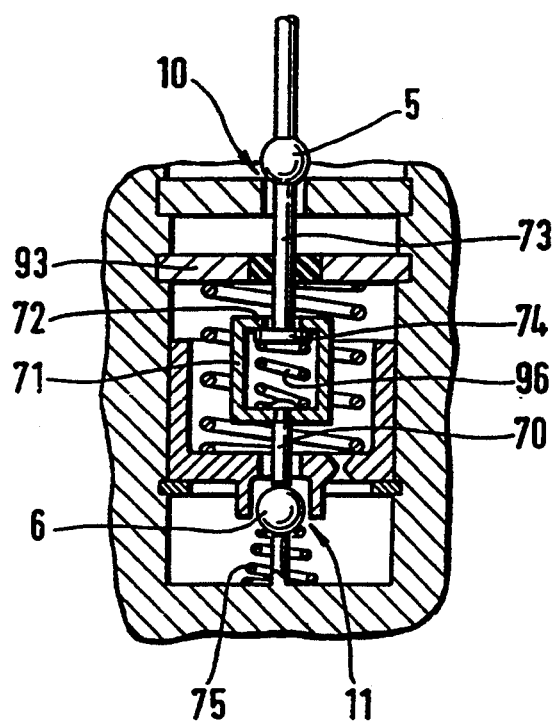
FIG. 6 is a partially sectional fragmentary view of a combined inlet-outlet valve according to a variant of the embodiments shown in FIGS. 4 and 5.

FIG. 6 shows an alternative of the coupled inlet-outlet valve as per FIG. 1. A physical separation exists between the closing element 6 of the inlet valve 11 and the rod 70.

At its upper end, a rod 70 is provided with a bushing 71 which is furnished with a stop 72. The rod 73 projects into the bushing 71, which is coupled to the closing element 5 of the outlet valve 10. The rod 73 is guided in the intermediate plate 93 by a seal. At its lower end 4 which in the event of opening of the outlet valve 10, that is to say, when the valve element 5 is lifted up, this will pull the rod 70 in an upward direction through the stop 72 and the bushing 71. A compression spring 96 is positioned between the bottom of the housing 71 and the collar 74.

The closing element 6 of the inlet valve 11 is subject to the pressure of the spring 75 which will urge the closing element 6 of the inlet valve against the valve seat of the inlet valve 11 when the outlet is open, that is to say, when the rod 70 has been pulled upward.

That means that as to its effect, in this embodiment there is an inverse relation as compared to the coupling as per FIGS. 1 to 5. In FIGS. 1 to 5, see, for example, FIG. 4, the closing element of the inlet valve 11 is rigidly coupled to the rod.

Figure 7:
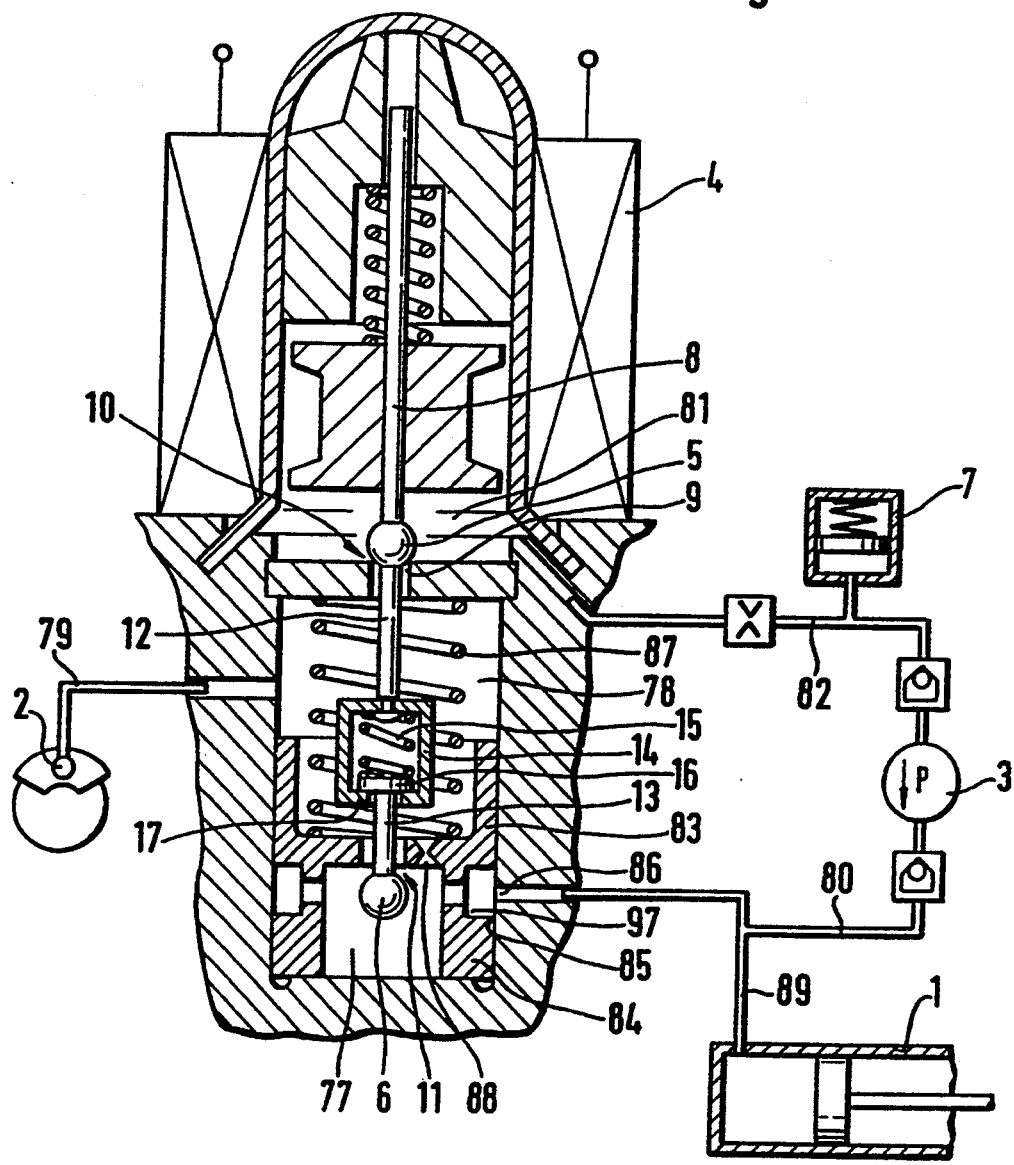

In the embodiment according to FIG. 7, a coupling is envisaged between the closing element 5 of the outlet valve 10 and the closing element 6 of the inlet valve 11 as has been described in reference to FIG. 1.

The differences of the embodiment according to FIG. 7 consists in that an intermediate plate with seal as is denoted by reference numeral 76 in FIG. 4 is eliminated in FIG. 7.

In the normal braking mode, the master cylinder 1 will deliver fluid through the line 89 into the master cylinder pump chamber 77.

Fluid will be conveyed through the opened inlet valve 11 into the wheel cylinder chamber 78. From there, fluid will be delivered over the line 79 to the wheel cylinder 2.

In the anti-locking control mode the pump 3 is put into operation. It delivers fluid via line 80 into the master cylinder pump chamber 77.

As described above, the inlet valve 11 is closed and outlet 10 is opened in the control mode. Fluid can be conveyed out of the wheel cylinder 2 over the line 79, through the wheel cylinder chamber 78, through the flow cross-sectional area 9 of the outlet valve, through the pump suction-side chamber 81, through the line 82 to the suction side of the pump 3.

Simultaneously, pressure will be built up by the pump 3 in the master cylinder pump chamber 77 which is higher than the pressure in the wheel cylinder chamber 78. Due to the pressure differential which is so generated, the bushing 83 which is furnished with an extension 84 and with a control edge 85 will move upward. The control edge 85 is formed by an annular groove 97 in the extension 84. Due to the upward motion of the bushing 83, the control edge 85 of the extension 84 enters the range of the cross-sectional area of the port 86 to the supply line of the pump 3 and of the master cylinder 1.

A self regulating effect comes about in this situation. The position of the control edge 85, the shape, the size and the position of the cross-sectional area of the port 86, the characteristic of the spring 87, the flow cross-sectional area of the orifice 88 which is positioned at the bottom of the bushing 83 are set with one another in such a way that the effect of a flow limiting valve which has been described before is brought about.

Figure 8:
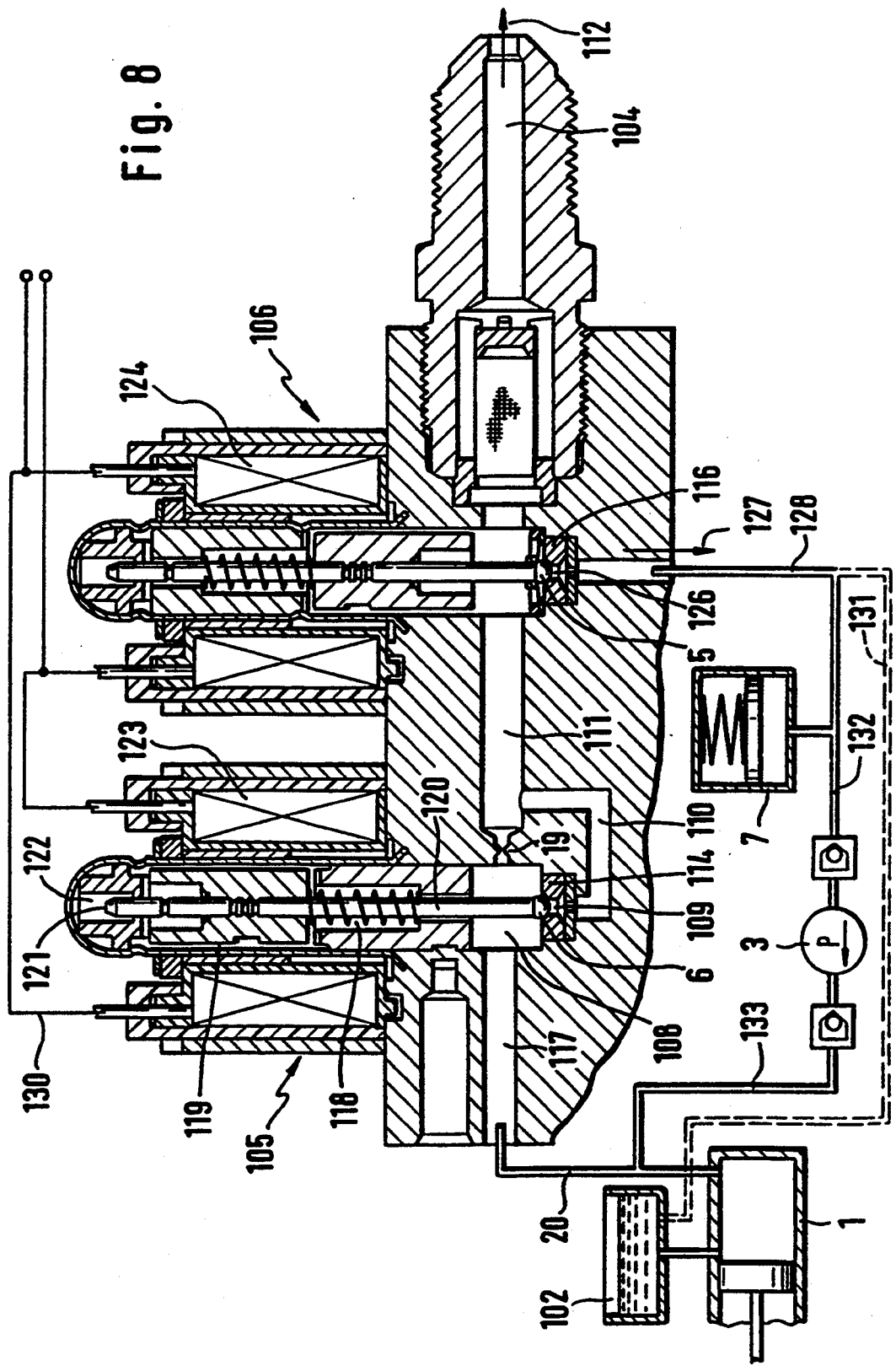
FIG. 8 shows a hydraulic circuit diagram and a partially sectional view of two solenoid valve assemblies according to another embodiment of the invention.

FIG. 8 shows the hydraulic circuit diagram and two solenoid valve assemblies according to the invention.

In FIG. 8, a master cylinder 1 is furnished with fluid from a reservoir 102. A pump 3 is put into operation in the control mode by a starting signal of the controller (not shown ), which starts the driving motor of the pump. A line 104 leads to the wheel cylinder of one brake.

Two valve assemblies are visible in FIG. 8 , an inlet solenoid valve 105 and an outlet valve 106.

As distinguished from the state of art, the inlet solenoid valve assembly 105 is not configurated as a standard valve, open when de-energized (NO valve). Rather the inlet solenoid valve 105 can perform the function of a non-return valve.

The outlet valve assembly 106 is configured as a valve closed when de-energized (NC valve).

In FIG. 8, the inlet solenoid valve 105 and the outlet valve assembly 106 are shown in the closed condition. That means that the closing element 6 of the inlet solenoid valve 105 rests on the valve seat 114, and the closing element 5 of the outlet valve assembly 106 rests on the valve seat 116.

In the normal braking mode, fluid is delivered by the master cylinder 1 over the line 20 into the chamber 108. In the normal braking mode, the inlet solenoid valve 105 is de-energized and open. Fluid is thus conveyed to the wheel cylinder through the open cross-sectional area 109 and through the ducts 110, 111. The delivery direction to the wheel is symbolized by the arrow 112.

In the anti-locking control mode, the coil 123 of the solenoid of the inlet solenoid valve 105 will be energized.

The closing element 6 will move downward and will close the valve seat 114. This is the situation which is illustrated in FIG. 8. As a result, the direct flow connection of the fluid between the duct 117 and the duct 110 will be interrupted.

Fluid will be conveyed through the annular passages 118, 119 and through the chamber 122 in the inlet solenoid valve assembly 105 to the rear side 121 of the rod 120 bearing the closing element 6 and, thus, onto the cross-sectional area of the closing element 6, which is effective as to pressure, and will press the latter onto the valve seat.

In this situation, the inlet solenoid valve 105 acts as a non-return valve 105.

That means that in the control mode the closing element 6 will be pressed onto the valve seat 114 by the master cylinder pressure and/or by the pressure of the pump also if and when the coil 123 is in the deenergized condition.

This results in the important advantage that the coil 124 of the outlet valve 100, closed when deenergized, may be controlled in accordance with the control algorithm through one line only for both coils 123, 124, without the closed condition of the inlet solenoid valve/non-return valve 105 being thereby canceled.

If at the beginning of the control mode, there has been an initial energization of the coil 123 of the inlet solenoid valve 105,, the valve 105 remains open no matter whether the energization of the coil 123 continues or is interrupted.

In the anti-locking control mode, fluid will restrictedly flow through the orifice 19 into the duct 111 when the non-return inlet valve 105 is in the closed condition.

For the purpose of a pressure reduction in the wheel cylinder in the anti-locking control mode, the valve 106, closed when deenergized, will be opened after the inlet solenoid valve 105 acting as a non-return valve has been closed.

In particular, by the energization of the coil 124 of the outlet valve 106, closed when deenergized, the valve seat 126 is opened due to the closing element 5 being lifted upward. As a result, fluid may be conveyed through the line 128 in the direction of the arrow 127 out of the wheel cylinder to the suction side of the pump 3. Reference numeral 7 denotes a damping unit which comprises a low-pressure accumulator.

In order to bring about a pressure rebuilding-up phase in the wheel cylinder during the control mode, the outlet valve 106, is closed when deenergized, is closed by interrupting the current supply to the magnet coil 124. As illustrated above, it is without importance that due to the common electric line also the magnet coil 123 of the inlet solenoid valve 105 is no longer energized, but the master cylinder pressure and/or the pump pressure will maintain the non-return valve 105 in its closed position as has been described above.

The common electric line 130 can be seen in FIG. 8. In this embodiment there is, a parallel connection of the coils 123 and 124. As mentioned in the beginning, the two coils may also be connected in series as well.

The invention is applicable for so-called open hydraulic systems or for closed systems.

In an open system, the hydraulic line 131 illustrated as a dashed line exists, which forms a connection to the fluid reservoir 102 being open with respect to the atmosphere.

The closed system is constituted by the lines 132, 133. Fluid is conveyed by the pump 3 directly into the supply line 20 between the master cylinder 1 and the inlet solenoid valve/non-return valve 105.

Further embodiments can be imagined for the realization of the basic thought of the invention. For example, it is possible to achieve the orifice function in that a recess is provided in the closing element 6 of the inlet solenoid valve, which acts the way of an orifice or of a restrictor.

In the same manner, a recess may be provided in the valve seat 114 of the inlet solenoid valve, which presents a small flow cross-sectional area and which, too, brings about an orifice effect in this way.

Summarizing the above, it can be said that by the present invention the conventional valve, open when deenergized, is replaced, as far as its effect is concerned, by a magnetically pilotable non-return valve, an orifice bypass in the non-return valve.

As an alternative of the forementioned design, the orifice may be connected in parallel. The magnet coils of the valve, closed when deenergized, and of the inlet solenoid valve acting as a non-return valve are, advantageously, controlled through a common line by one driver stage only of the electronic controller. The electrical circuits of the solenoid are designed such that the inlet solenoid valve which performs the function of a non-return valve closes before, closed when deenergized, opens. Now, once the inlet solenoid valve with its non-return valve function is closed, it will remain closed also without energization of the coil, and for that matter, as long as the master cylinder pressure and/or the pump pressure is higher than the pressure in the wheel cylinder.

What is claimed is:

1. A brake system for automotive vehicles including a wheel brake, a master cylinder, and a wheel cylinder for said wheel brake, a brake pressure control system for the control of the hydraulic pressure within said wheel cylinder in the course of a brake pressure control mode, said brake pressure control system including a motor-driven pump for the generation of said hydraulic pressure, said pump having an inlet and an outlet, an electronic controller means,
- an inlet valve means for said wheel cylinder, comprised of an inlet solenoid valve having an electromagnetically controllable valve element operated by said electronic controller means controlling communication between said master cylinder and said pump outlet with said wheel cylinder, an orifice interposed to allow direct, but restricted communication between said master cylinder and pump outlet and said wheel cylinder, in a normal uncontrolled braking mode said inlet solenoid valve being deenergized and open, and in a control mode said inlet solenoid valve switched by energization in first control phase into a closed condition, fluid pressure means acting on said inlet solenoid valve controllable valve element in a second control phase to cause said inlet solenoid valve element to be held closed under the action of pressure developed by either of said master cylinder or by said pump and is maintained in said closed position despite being deenergized, in said closed condition, fluid under pressure allowed to flow restrictedly through said orifice to said wheel cylinder, an electromagnetically controllable outlet valve operated by said electronic controller means controlling communication of said wheel cylinder to a low pressure region, said outlet valve in closed condition when deenergized, said electronic controller means causing said outlet valve to be switched into an open position in the control mode in order to bring about pressure decreases within said wheel cylinder, a common electric control line connected to both said inlet solenoid valve and said outlet valve for energizing each with a single command signal from said electronic controller means.

* * * * *